United States Patent
Comparon et al.

(10) Patent No.: US 8,598,895 B2
(45) Date of Patent: Dec. 3, 2013

(54) SYSTEM AND METHOD TO MEASURE DIELECTRIC CONSTANT IN A SUBTERRANEAN WELL

(75) Inventors: Laetitia Comparon, Chatillon (FR); Mehdi Hizem, Paris (FR)

(73) Assignee: Schlumberger Technology Corporation, Sugar Land, TX (US)

(*) Notice: Subject to any disclaimer, the term of this patent is extended or adjusted under 35 U.S.C. 154(b) by 349 days.

(21) Appl. No.: 12/669,195

(22) PCT Filed: Jun. 9, 2008

(86) PCT No.: PCT/EP2008/004679
§ 371 (c)(1),
(2), (4) Date: May 19, 2010

(87) PCT Pub. No.: WO2009/010132
PCT Pub. Date: Jan. 22, 2009

(65) Prior Publication Data
US 2010/0283486 A1    Nov. 11, 2010

Related U.S. Application Data (60) Provisional application No. 60/950,382, filed on Jul. 18, 2007.

(51) Int. Cl.
*G01V 3/00* (2006.01)
*G01V 3/10* (2006.01)

(52) U.S. Cl.
USPC .......................... 324/686; 324/338; 324/341

(58) Field of Classification Search
USPC ......... 324/341, 339, 338, 334, 333, 332, 323, 324/324, 346, 351, 355, 368, 439, 686, 324/722; 73/152.01, 152.02; 702/6, 7, 9, 11
See application file for complete search history.

(56) References Cited

U.S. PATENT DOCUMENTS

| | | | |
|---|---|---|---|
| 3,893,021 A | | 7/1975 | Meador et al. |
| 4,780,679 A | * | 10/1988 | Kenyon et al. ............... 324/338 |
| 4,876,512 A | * | 10/1989 | Kroeger et al. .............. 324/376 |
| 2004/0220741 A1 | | 11/2004 | Haugland |

OTHER PUBLICATIONS

Kenyon, 1983, Texture effects on megahertz dielectric properties of Calcite rock samples, J. Appl. Phys. vol. 55 (8).*
Waxman and Smits: "Electrical Conductivities in Oil-Bearing Shaly Sands" Society of Petroleum Engineers Journal, vol. 8, No. 2, Jun. 1968, pp. 107-122, XP002562015.
Kenyon, 1983, "Texture effects on megahertz dielectric properties of calcite rock samples," J. Appl. Phys., vol. 55 (8).

* cited by examiner

*Primary Examiner* — Melissa Koval
*Assistant Examiner* — Farhana Hoque
(74) *Attorney, Agent, or Firm* — Stephanie Chi; Jody DeStefanis (57) ABSTRACT

A method and system to predict dielectric behavior in a wide frequency range in a wellbore. The method comprising: deploying a tool in a wellbore, measuring the permittivity and conductivity at more than one frequency of a formation with the tool, and predicting the dielectric behavior of saline water in a wide band frequency range and temperature.

7 Claims, 12 Drawing Sheets

SYSTEM AND METHOD TO MEASURE DIELECTRIC CONSTANT IN A SUBTERRANEAN WELL

BACKGROUND

In the oil and gas field, no satisfactory theoretical expression exists today to predict dielectric behavior in a wide band frequency range. All attempts and prior known work in the area do not yield any useful models that can be used to extract petrophysical information from a wideband measurement of permittivity and conductivity. Such model and measurement would be particularly useful to gather information in shaly sand formations.

SUMMARY OF THE INVENTION

The invention is a scaling method that allows an expression of the dielectric properties of a water filled rock that is independent of frequency and salinity. Based on that, a behavioral empirical model is then extracted to fit these measurements. The invention also comprises the method of using such expression and model in the oil and gas environment to extract information from a wellbore, particularly from shaly sand formations. The invention also comprises a tool and system that takes the measurement utilizing such method.

BRIEF DESCRIPTION OF THE DRAWINGS

Various aspects of this disclosure may be better understood upon reading the following detailed description and upon reference to the drawings in which.

DETAILED DESCRIPTION

To our knowledge, there is no model which can describe the complex dielectric permittivity of shaly sandstones, in the 10 MHz-2 GHz frequency range. The exact polarization process is not very well known. It has however been observed that the dielectric dispersion depends on the clay content. The clay content is expressed here through the CEC (cation exchange capacity) of the rock, or through the cation exchange per pore volume unit, Qv. Qv is linked to the CEC by:

$$Q_v = \rho_m \frac{1-\phi}{\phi} CEC$$

where $\rho_m$ is the matrix density and $\phi$ the porosity of the rock.

Figure 1A:
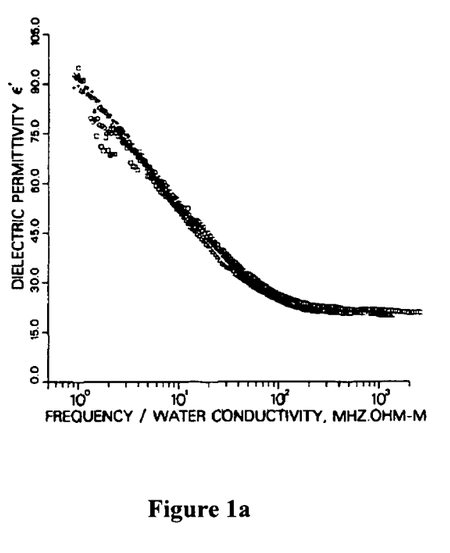
FIG. 1a is a plot of the dielectric permittivity versus the frequency/water conductivity (f/$\sigma_w$) for Whitestone with four different resistivities of saturating water, in accordance with an embodiment.
Figure 1B:
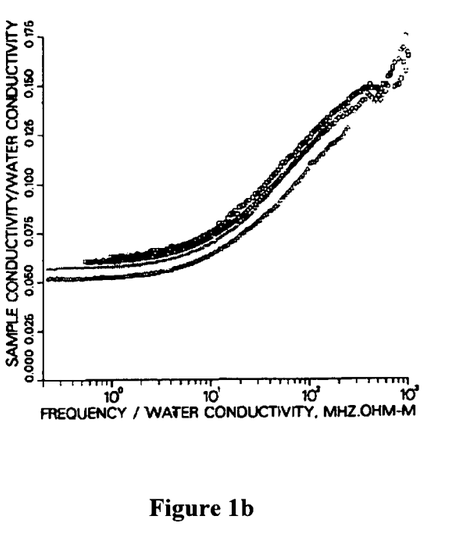
FIG. 1b is a plot of the conductivity/water conductivity $\sigma/\sigma_w$ versus frequency/water conductivity f/$\sigma_w$, in accordance with an embodiment.

The electrical parameters (electrical conductivity, $\sigma$, and dielectric permittivity, $\in$) also vary with the frequency, f, the pore water conductivity, $\sigma_w$, the water fraction, $\phi$), and the porous network connectivity. Kenyon, 1983 (in *Texture effects on megahertz dielectric properties of calcite rock samples, J. Appl. Phys.*, vol. 55(8)) showed that, in the frequency range between 1 MHz and 1 GHz, the effect of the parameters frequency and pore water conductivity can be taken into account by a simple normalization of the frequency axes and of the conductivity axes (see FIGS. 1a and 1b)

$$f_{noromalized} = f/\sigma_w$$

$$\sigma_{noromalized} = \sigma/\sigma_w$$

FIG. 1a illustrates the dielectric permittivity versus the frequency/water conductivity (f/$\sigma_w$) for Whitestone with four different resistivities of saturating water. FIG. 1b illustrates the conductivity/water conductivity $\sigma/\sigma_w$ versus frequency/water conductivity f/$\sigma_w$. (From Kenyon, 1983).

Figure 2:
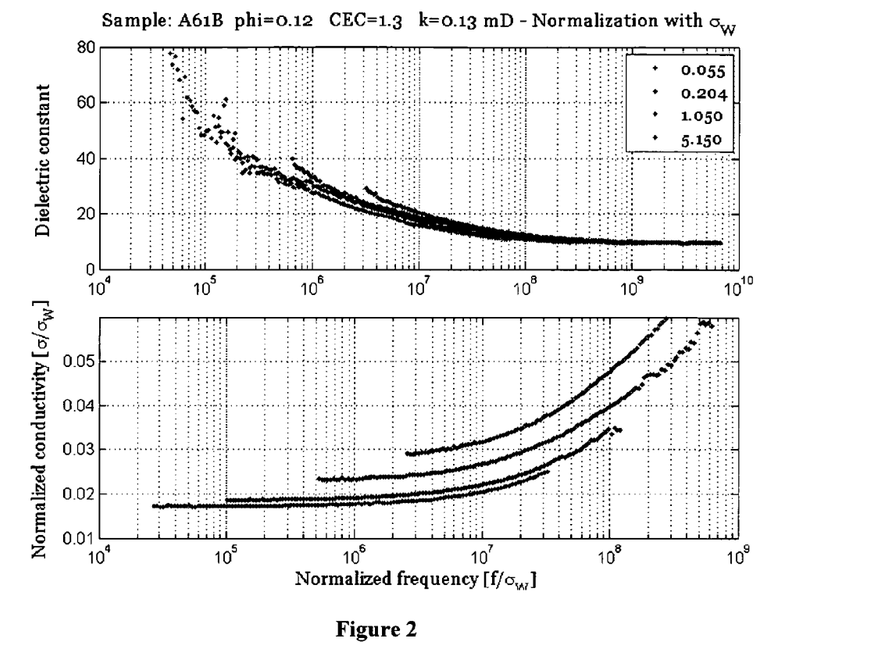
FIG. 2 are plots of a normalization of the dielectric and electrical spectra, in accordance with an embodiment.

This normalization works fine for carbonate rocks, but fails for shaly sands (see FIG. 2). FIG. 2 shows experimental evidence of the failure of the classical normalization of the dielectric (top) and electrical (bottom) spectra. The normalization coefficient is $\sigma_w$. The legend is the pore water resistivity values.

1—Spectra Normalization

Figure 3:
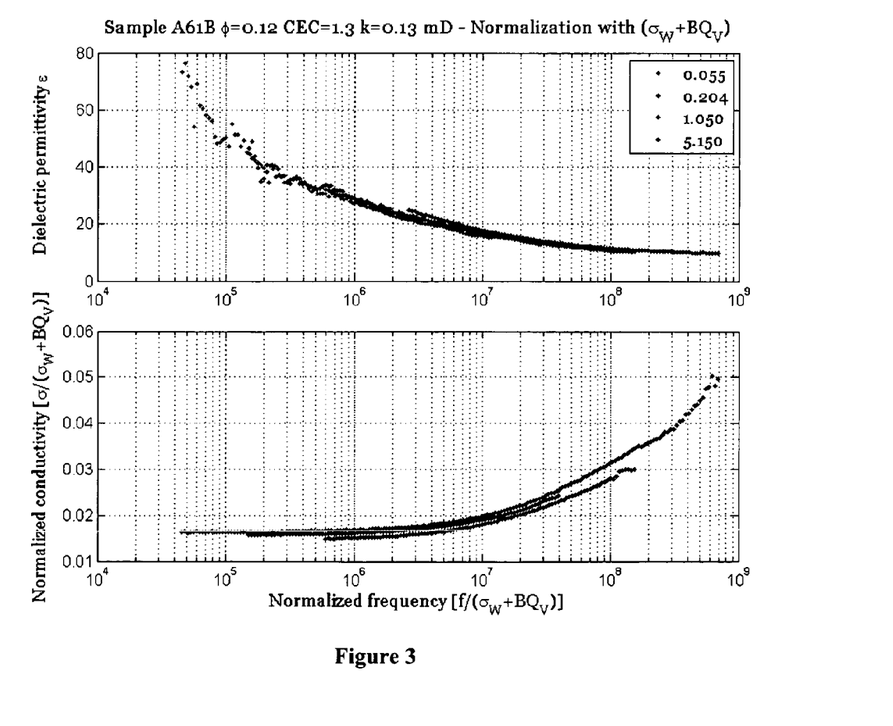
FIG. 3 are other plots of a normalization of the dielectric and electrical spectra, in accordance with an embodiment.

It is however observed on more than many shaly sand samples of various origins, that the normalization technique works if the normalization factor used is modified. The new normalization coefficient is ($\sigma_w$+BQv) instead of $\sigma_w$ previously used, following the writing of Waxman and Smits, 1968 (in *Electrical conductivities in oil-bearing sands, Soc. Pet. Eng. J., Trans., AIME*, vol. 243), where Qv is the cation exchange capacity per unit of porous volume, and B a coefficient that depends on pore water conductivity and temperature. FIG. 3 shows experimental evidence of the normalization of the dielectric (top) and electrical (bottom) spectra (one example of this normalization); note that the conductivities agree well. The normalization coefficient is ($\sigma_w$+BQv). The legend is the pore water resistivity values.

In this invention, an empirical model for fully saturated shaly sandstones is used. The model takes into account the facts that:

there is experimental evidence that both the dielectric permittivity and the electrical conductivity can be normalized by the following quantity:

$$N = \sigma_w + B \cdot Q_v$$

Each fully water saturated rock sample can be described by two single spectra:

dielectric permittivity versus normalized frequency $f/(\sigma_w + B \cdot Q_v)$ normalized conductivity $\sigma/(\sigma_w + B \cdot Q_v)$ versus normalized frequency $f/(\sigma_w + B \cdot Q_v)$ at high frequency (typically above 1 GHz) the CRI model was successfully describing the dielectric permittivity, $\in$, because it contains only volumetric information:

$$\sqrt{\in} = \phi\sqrt{\in_w} + (1-\phi)\sqrt{\in_m}$$

where $\in_w$ is the water dielectric permittivity, $\in_m$, the matrix dielectric permittivity, $\phi$ the porosity (water fraction).

Based on this observation we use the normalized permittivity:

$$Y_\varepsilon = \frac{\sqrt{\varepsilon} - (1-\phi)\sqrt{\varepsilon_m}}{\phi\sqrt{\varepsilon_w}}$$

at very low frequency, the conductivity follows the Waxman and Smits law:

$$\sigma = (\sigma_w + B \cdot Q_v)\phi^m$$

where $\sigma_w$ is the water conductivity, $Q_v$ the exchange cation molarity, m the cementation exponent, and B a coefficient obtained by Waxman and Smits. Based on this observation we use the normalized conductivity:

$$Y_\sigma = \frac{\sigma}{(\sigma_w + B \cdot Q_v)\phi^m}$$

2—Conductivity Spectrum Fitting

We observed that there is a correlation between the normalized conductivity and the parameter Qv. If:

$$f_{norm} = f/(\sigma_w + B \cdot Q_v)$$

$$\sigma_{norm} = \sigma/((\sigma_w + B \cdot Q_v)\phi^m)$$

B is a function of temperature and water conductivity, Qv is a function of porosity, CEC, and matrix density.

It is observed that:

$$\log(\sigma_{norm}) = \alpha(f_{norm}) + 10^{(\log(Q_v) + \beta(f_{norm}))\gamma(f_{norm})}$$

Figure 4A:
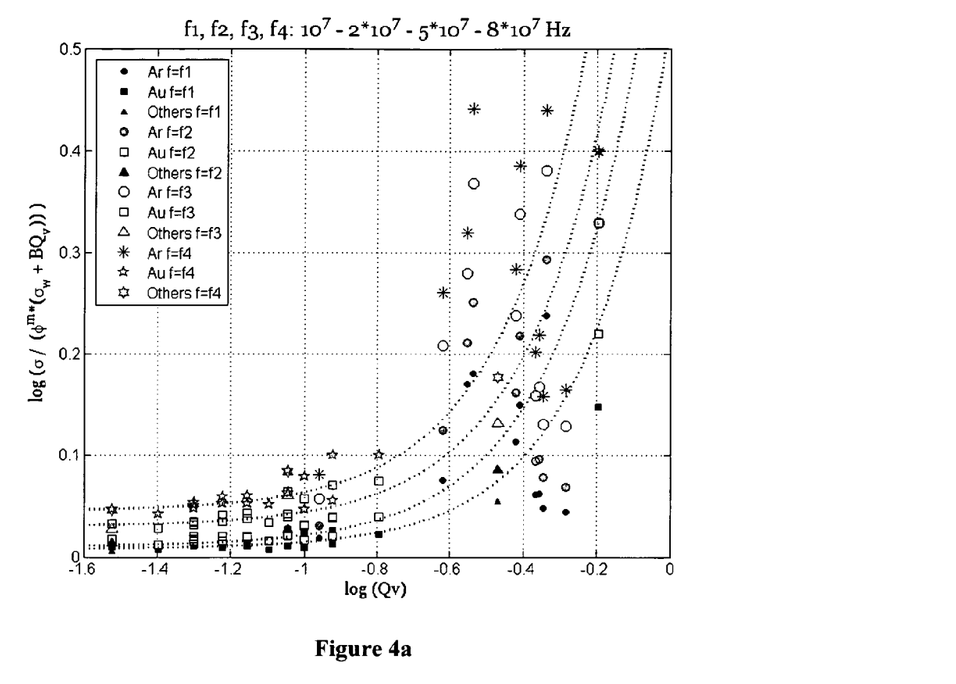
FIGS. 4a and 4b are plots representing correlations between the normalized conductivity and Qv at different normalized frequencies, in accordance with an embodiment.
Figure 4B:
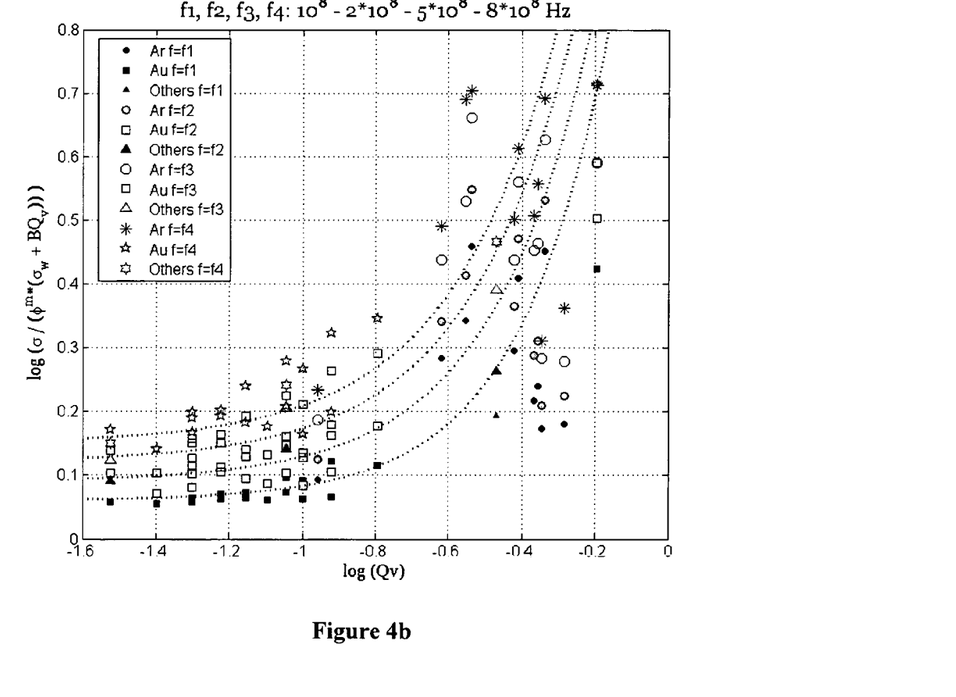

FIGS. 4a and 4b show correlations between the normalized conductivity and Qv at different normalized frequencies.

Figure 5A:
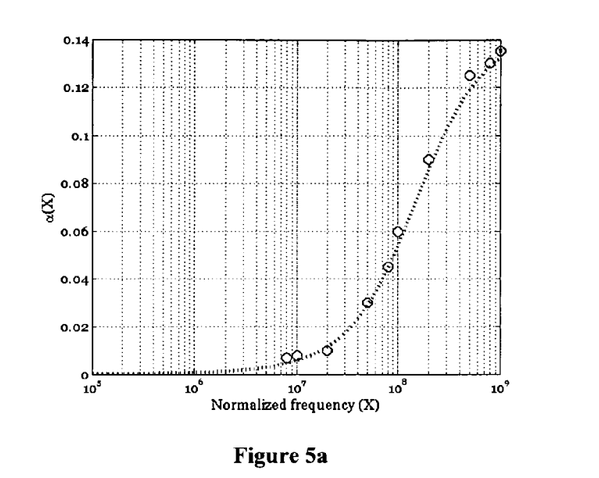
FIGS. 5a-5c are other plots representing correlations between the normalized conductivity and Qv at different normalized frequencies, in accordance with an embodiment.
Figure 5B:
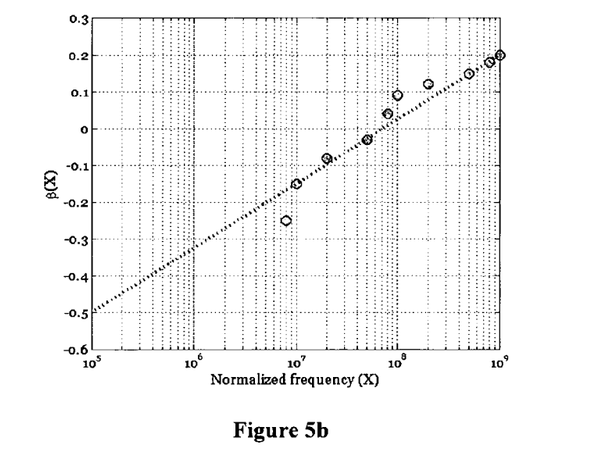
Figure 5C:
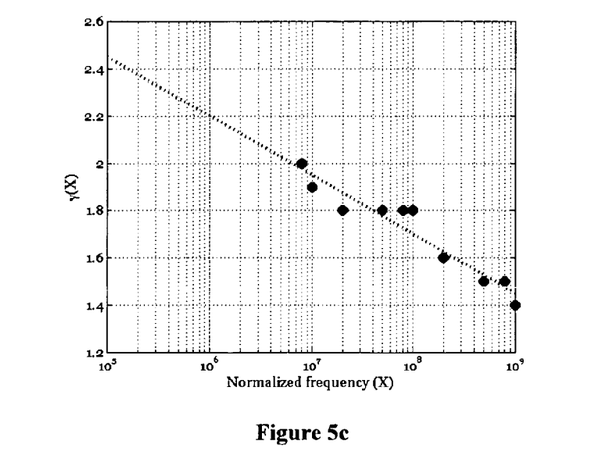

FIGS. 5a-5c illustrate the correlation coefficients for the normalized conductivity expressed above.

$$\alpha(f_{norm}) = 0.145 * \mathrm{Re}\left(1 - \frac{1}{1 + \left(i\frac{f_{norm}}{1.5 \cdot 10^8}\right)^{0.82}}\right)$$

$$\beta(f_{norm}) = 0.175 * \log_{10}(f_{norm}) - 1.375$$

$$\gamma(f_{norm}) = -0.25 * \log_{10}(f_{norm}) - 3.7$$

Hence, if the temperature and matrix density are known, the conductivity depends only on: porosity, CEC, water salinity, and the cementation exponent.

Figure 6:
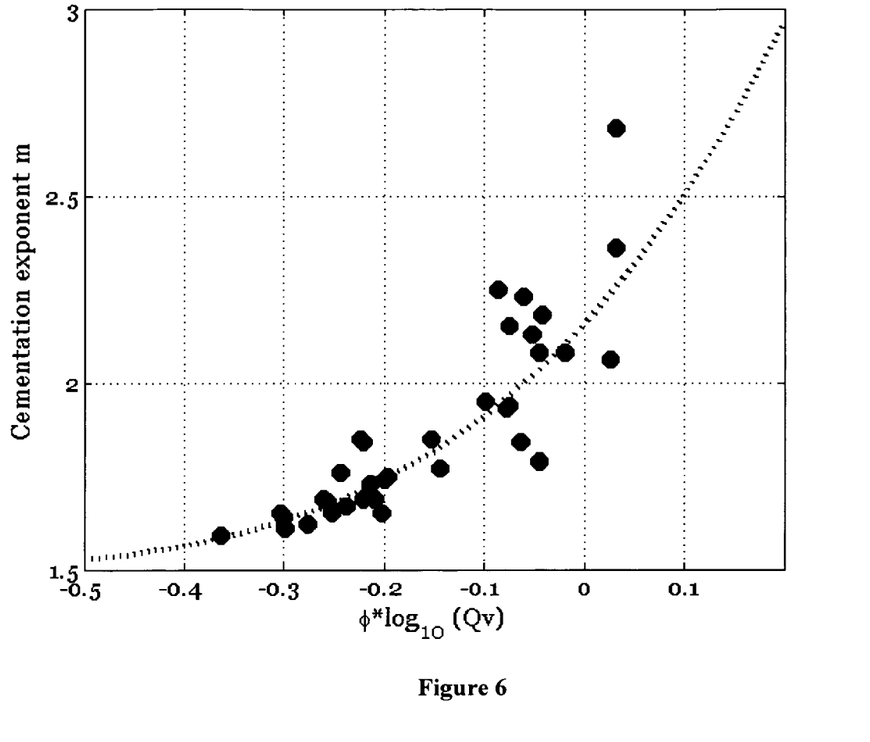
FIG. 6 is a plot representing the cementation exponent versus porosity and Qv, in accordance with an embodiment.

We propose to invert the spectra for these 4 parameters, or to include an empirical relationship relating the cementation exponent to the CEC and the porosity, so that the inversion can be for 3 parameters only. FIG. 6 shows the cementation exponent versus porosity and Qv for 35 samples.

3—Permittivity Spectrum Fitting

We observed that there is a correlation between the normalized conductivity and the parameter Qv if corrected by the porosity and the cementation exponent. The fits depend on the normalized frequency:

$$f_{norm} = f/(\sigma_w + B \cdot Q_v)$$

B is a function of temperature and water conductivity, Qv is a function of porosity, CEC, and matrix density.

$$\varepsilon_{norm} = \frac{\sqrt{\varepsilon} - (1-\phi)\sqrt{\varepsilon_m}}{\phi\sqrt{\varepsilon_w}}$$

$$\varepsilon_{norm} = \alpha(f_{norm}) + 10^{(\beta(f_{norm}) + \log(Q_v))}$$

$$\varepsilon_{norm} = \alpha(f_{norm}) + Q_v * 10^{\beta(f_{norm})}$$

Figure 7A:
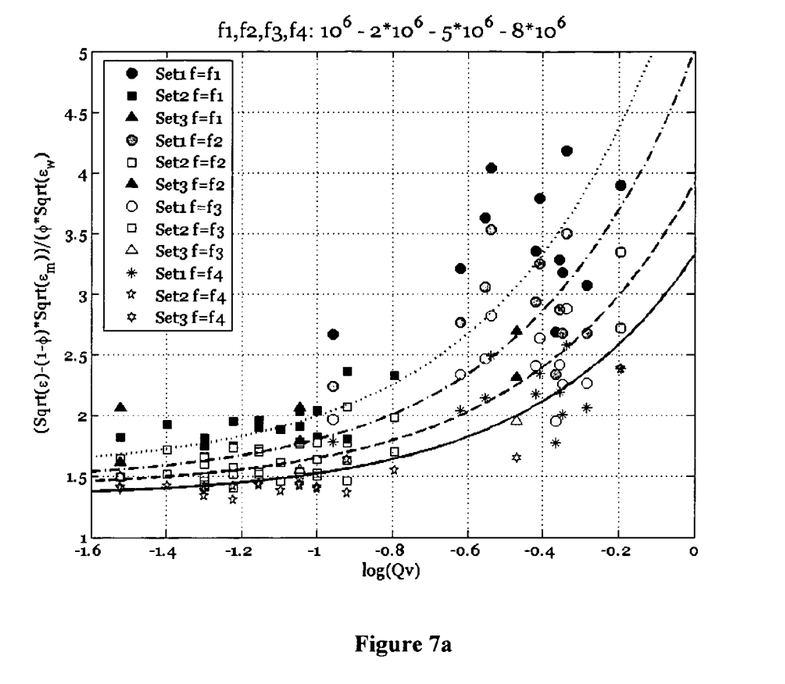
FIGS. 7a and 7b are plots representing correlations between the normalized permittivity and log(Qv) at different normalized frequencies, in accordance with an embodiment.
Figure 7B:
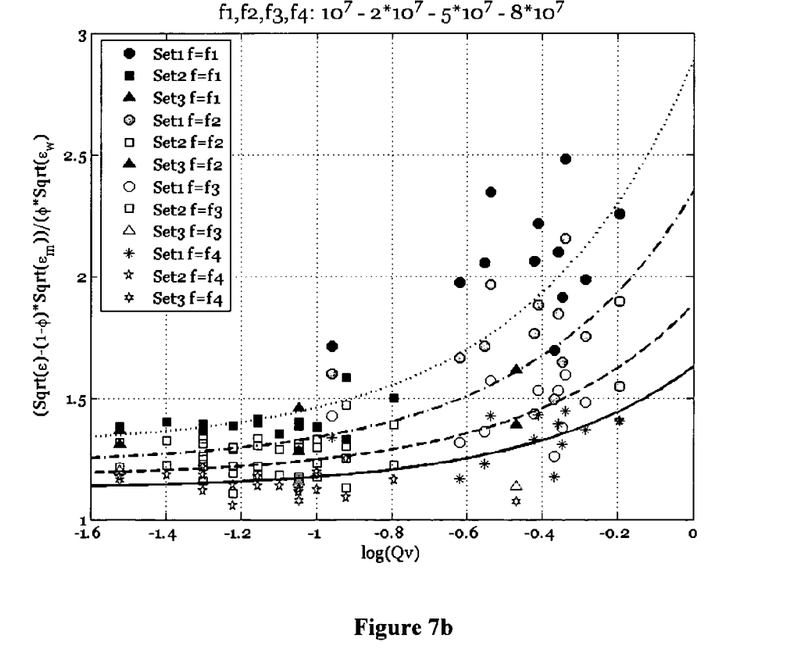

FIGS. 7a and 7b show correlations between the normalized permittivity and log(Qv) at different normalized frequencies.

The following fits were obtained for the α and β coefficients:

$$\alpha(f_{norm}) = \mathrm{Re}\left(a1 + \frac{a2}{1 + \left(i\frac{f_{norm}}{a3}\right)^{a4}}\right)$$

$a1 = 1.090 \quad a2 = 22.93 \quad a3 = 10^4 \quad a4 = 0.649$ $$\beta(f_{norm}) = \mathrm{Re}\left(b1 + \frac{b2}{1 + \left(i\frac{f_{norm}}{b3}\right)^{b4}}\right)$$

$b1 = -1.1245 \quad b2 = 1.865 \quad b3 = 5*10^7 \quad b4 = -0.546$

Hence, if the temperature, the matrix density, and the matrix dielectric permittivity are known, the dielectric permittivity depends only on: porosity, CEC, water salinity, and the cementation exponent.

We propose to invert the spectra for these 4 parameters, or to include an empirical relationship relating the cementation exponent to the CEC and the porosity, so that the inversion can be for 3 parameters only.

Figure 8A:
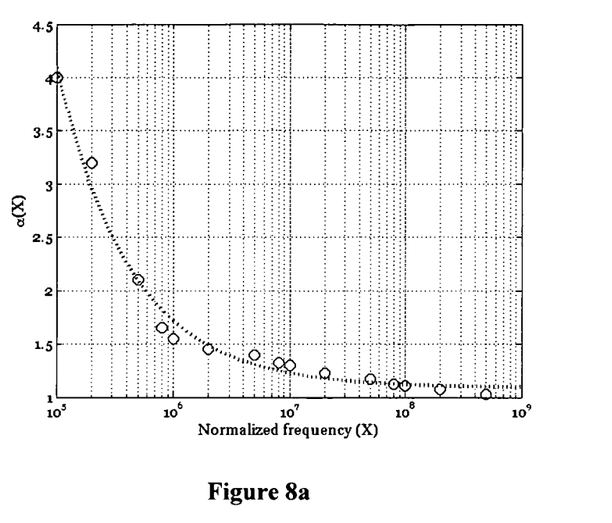
FIGS. 8a and 8b are plots representing correlations coefficients for the normalized permittivity, in accordance with an embodiment.
Figure 8B:
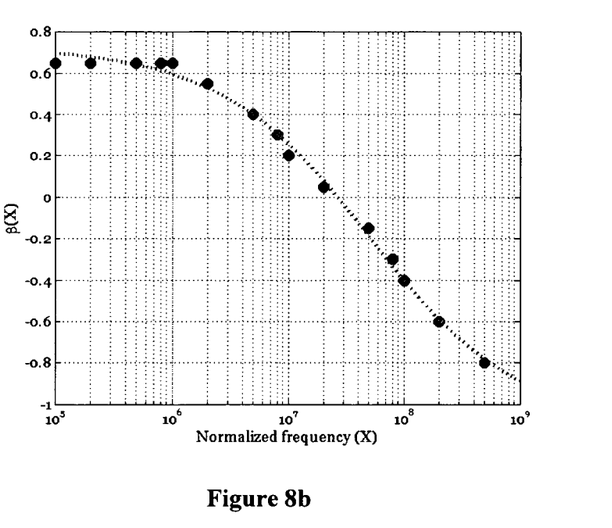

FIGS. 8a and 8b illustrate correlation coefficients for the normalized permittivity.

Another possibility is to use the correlation between the normalized permittivity and the parameter $\log(\phi^m/Q_v)$. In that case:

$$x = \log\left(\frac{\phi^m}{Q_v}\right)$$

Figure 9A:
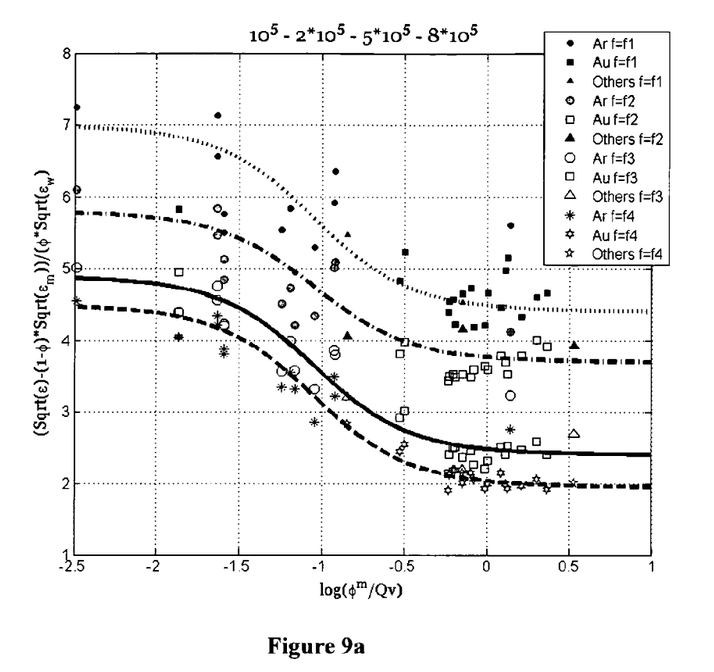
FIGS. 9a-9c are plots representing correlations between the normalized conductivity and the parameter x=log($\theta^m/Q_v$) at different normalized frequencies, in accordance with an embodiment.
Figure 9B:
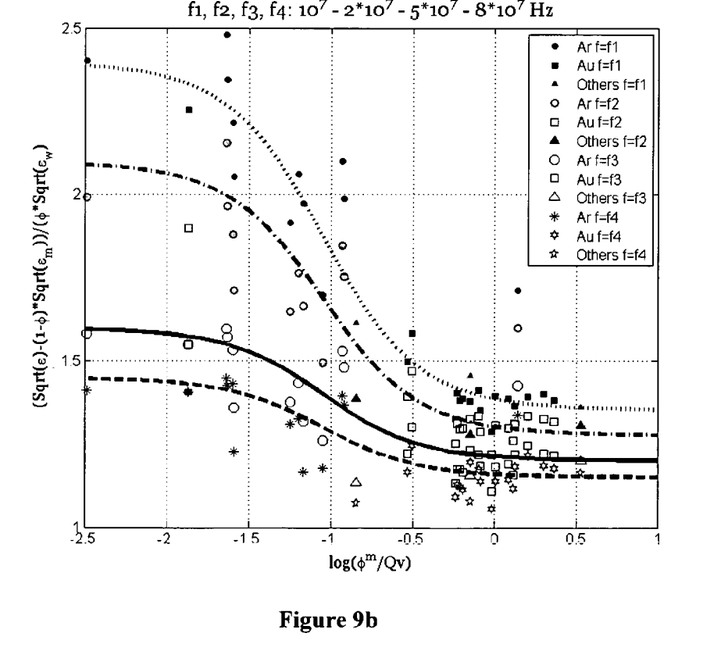
Figure 9C:
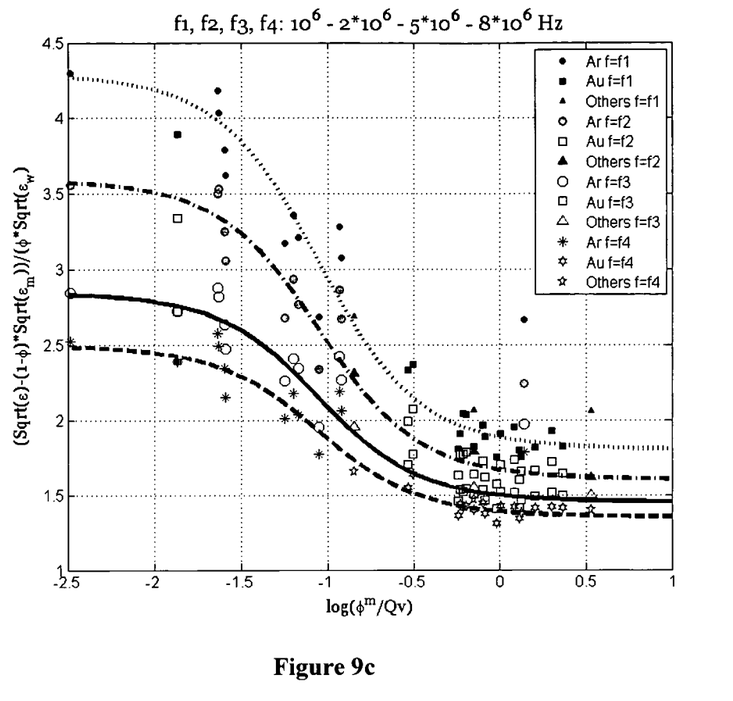

FIGS. 9a-9c show correlations between the normalized conductivity and the parameter $x = \log(\phi^m/Q_v)$ at different normalized frequencies.

$$\varepsilon_{norm} = \mathrm{Re}\left(\alpha(f_{norm}) + \frac{\beta(f_{norm}) - \alpha(f_{norm})}{1 + \left(i\frac{10^x}{10^{-1.05}}\right)^{0.88}}\right)$$

The following coefficients fit were obtained for the α, and β coefficients above:

$$\alpha(f_{norm}) = \text{Re}\left(a1 + \frac{a2}{1+\left(i\frac{f_{norm}}{a3}\right)^{a4}}\right)$$

$a1 = 1.126 \quad a2 = 6.75 \quad a3 = 10^5 \quad a4 = 0.677$ $$\beta(f_{norm}) = \text{Re}\left(b1 + \frac{b2}{1+\left(i\frac{f_{norm}}{b3}\right)^{b4}}\right)$$

$b1 = 0.594 \quad b2 = 12.53 \quad b3 = 10^5 \quad b4 = 0.361$

Figure 10A:
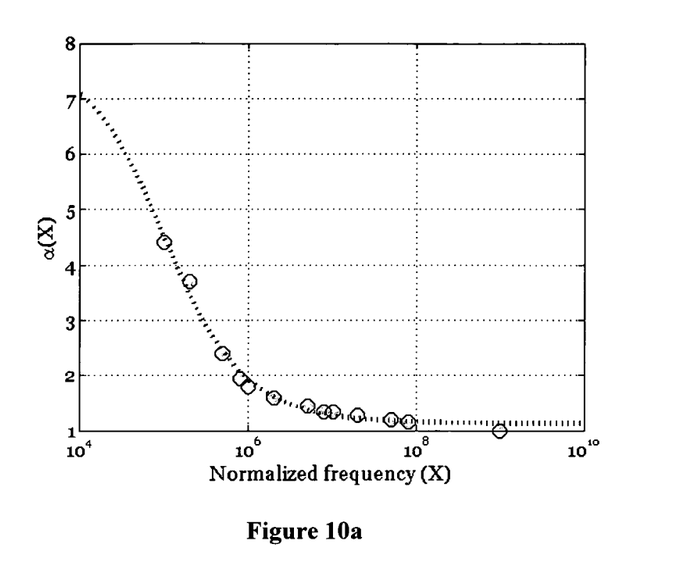
FIGS. 10a and 10b are plots representing correlation coefficients for the normalized permittivity, in accordance with an embodiment.
Figure 10B:
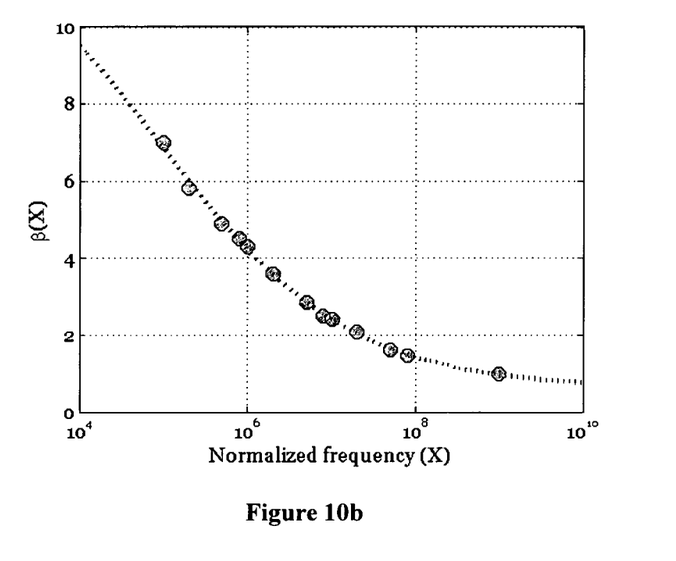
Figure 11A:
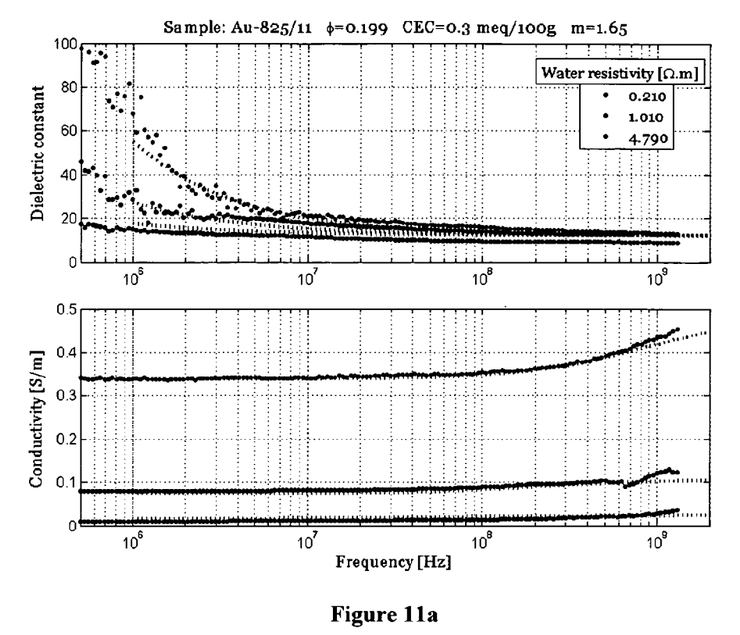
FIGS. 11a-11d are plots representing the results of the obtained model on multiple cores having different salinities, in accordance with an embodiment.
Figure 11B:
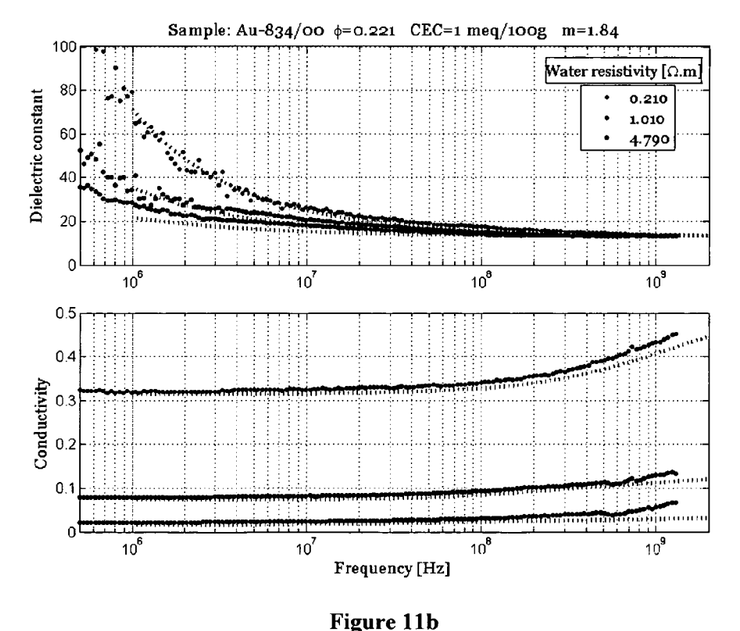
Figure 11C:
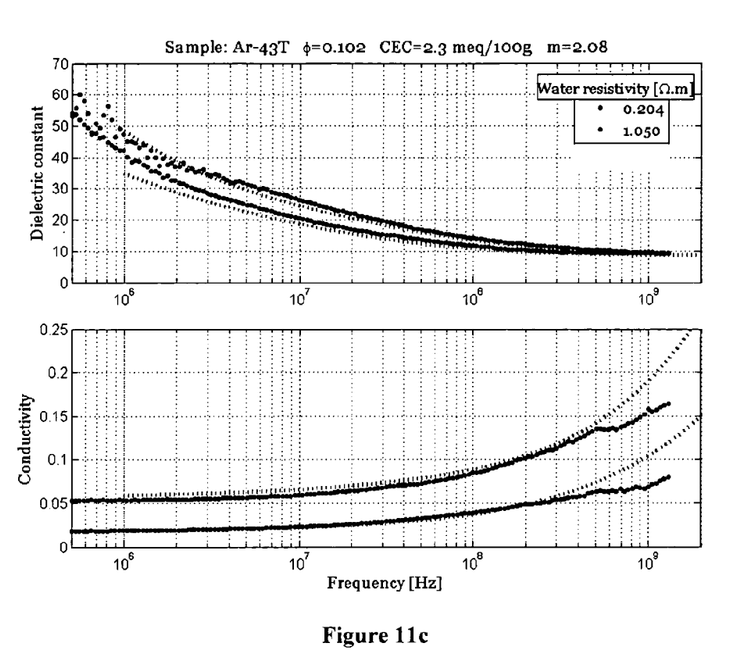
Figure 11D:
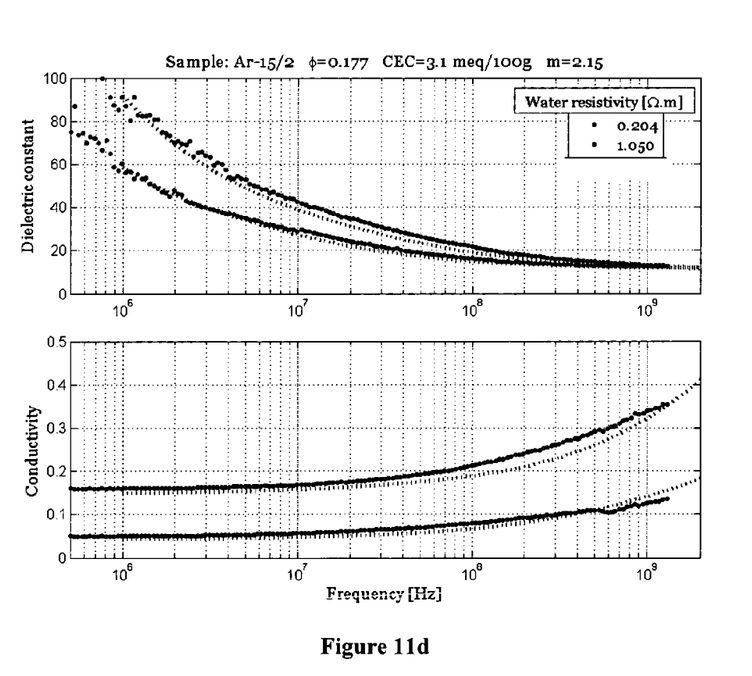

FIGS. 10a and 10b illustrate correlation coefficients for the normalized permittivity.

4—Model Final Expression $$\varepsilon^* = \varepsilon + i\frac{\sigma}{\omega\varepsilon_0}$$

where ω is the circular frequency of the electromagnetic wave and:

$$\sigma(\phi,\sigma_w,m,CEC,f,T) = ((\theta_w + B \cdot Q_v)\phi^m) \times 10^{\alpha 1(f_{norm})+10^{(\log(Q_v)+\beta 1 f_{norm})\gamma 1(f_{norm})}} \quad \text{equation 1}$$

$$\in(\phi,\sigma_w,m,CEC,f,T) = ((1-\phi)\sqrt{\in_m} + \phi\sqrt{\in_w} \times (\alpha_2(f_{norm}) + 10^{\beta 2(f_{norm})}Q_v))^2 \quad \text{equation 2}$$

where:

$$Q_v = \rho_m \frac{1-\phi}{\phi} CEC,$$

$f_{norm} = f/(\sigma_w + B \cdot Q_v)$, T is the temperature for B and $\in_w$ determination 5—Test on a Few Lab Data at Various Salinities FIGS. 11a-11d illustrates the results of the obtained model on multiple cores having different salinities.

6—Application on a Real Log

In operation, a tool is deployed in a wellbore utilizing a conveyance device, such as a wireline, a slickline, a drill pipe, a coiled tubing, or a production tubing. Once the tool is in position close or adjacent to the target formation, sensors in the tool take measurements of the following parameters: ∈ (permittivity), σ (conductivity) and T Permittivity and conductivity are measured at multiple frequencies in the range 10 MHz to 2 GHz.

The calculations and further processing can be performed by the tool downhole or the measurements can be transmitted to the surface for further processing.

An inversion algorithm is then performed using equations 1 and 2 to obtain φ, $\sigma_w$, m, CEC.

This inversion works in a classical way known by people skilled in the art. The goal is to match the measured permittivities and electrical conductivities at the different frequencies to the predicted permittivity and electrical conductivity by the model (equation 1 and 2) through the adjustment of the first guessed parameters we are trying to determine (φ, $\sigma_w$, m, CEC). Usually, a cost function including at least the error between the measured permittivity and electrical conductivity and the predicted permittivity and electrical conductivity by the model, is minimized. The direction of minimization is determined through the derivative of the model at the last estimate of the parameters (φ, $\sigma_w$, m, CEC) and an iteration algorithm ensures that the last estimate reduces the error at least at the measurement error bar.

A simplified version would link m and CEC using the well know shaly sand formulation:

m=$m_0$+f(CEC) where $m_0$ is either set or picked in a clean section.

The invention claimed is:

1. A method to predict dielectric behavior in a wide frequency range in a wellbore, comprising:
    deploying a tool in a wellbore;
    measuring a permittvity and a conductivity at more than one frequency of a formation with the tool;
    predicting a dielectric behavior of saline water in a wide band frequency range and temperature, wherein predicting the dielectric behavior comprises normalizing a dielectric permittivity frequency dependence by using a water conductivity and a cation exchange capacity per unit of porous volume, and wherein the wide band frequency range comprises a frequency range from approximately 10 MHz to approximately 2 GHz.

2. The method of claim 1, wherein the formation is a shaly sand formation.

3. The method of claim 1, wherein the predicting step comprises normalizing an electrical conductivity by a water conductivity and a cation exchange capacity per unit of porous volume, and its frequency dependence by using the water conductivity and the cation exchange capacity per unit of porous volume.

4. The method of claim 1, wherein the predicting step comprises normalizing a dielectric permittivity and the electrical conductivity by using a coefficient that depends on pore water conductivity and temperature.

5. The method of claim 1 or 3 wherein a normalized permittivity and electrical conductivity are fitted using coefficients that depends on a cation exchange capacity per unit of porous volume.

6. A system to determine a cation exchange capacity per unit of porous volume and a cementation exponent in a wellbore, comprising:
    a tool adapted to be conveyed in a wellbore;
    sensors on the tool to measure the permittivity and a electrical conductivity at more than one frequency of a formation with the tool;
    predicting a dielectric behavior of saline water in a wide band frequency range and temperature, wherein predicting the dielectric behavior comprises normalizing a dielectric permittivity frequency dependence by using a water conductivity and a cation exchange capacity per unit of porous volume, and wherein the wide band frequency range comprises at least a frequency range from approximately 10 MHz to approximately 2 GHz.

7. The system of claim 6, wherein the formation is a shaly sand formation.

* * * * *